(12) United States Patent
Gort-Barten et al.

(10) Patent No.: US 6,297,477 B1
(45) Date of Patent: Oct. 2, 2001

(54) ELECTRIC COOKING AND TOASTING APPARATUS AND ELECTRIC ELEMENTS THEREFOR

(75) Inventors: Leslie Alexander Gort-Barten, Dulwich Common; Brian Milton, Keston, both of (GB)

(73) Assignee: Dualit Limited (GB)

( * ) Notice: Subject to any disclaimer, the term of this patent is extended or adjusted under 35 U.S.C. 154(b) by 0 days.

(21) Appl. No.: 09/701,382

(22) PCT Filed: Apr. 23, 1999

(86) PCT No.: PCT/GB99/01257

§ 371 Date: Dec. 1, 2000

§ 102(e) Date: Dec. 1, 2000

(87) PCT Pub. No.: WO99/65279

PCT Pub. Date: Dec. 16, 1999

(30) Foreign Application Priority Data

Jun. 8, 1998 (GB) .................................................. 9812240
Jun. 12, 1998 (GB) .................................................. 9812597
Dec. 2, 1998 (GB) .................................................. 9826294

(51) Int. Cl.$^7$ .............................. A47J 37/08; H05B 3/06; H05B 3/18; H05B 3/26; H05B 3/28
(52) U.S. Cl. .......................... 219/386; 219/392; 219/402; 219/409; 219/544; 219/548
(58) Field of Search .................................. 219/386, 392, 219/395, 402, 408, 409, 521, 532, 536, 542, 544, 546, 548; 99/327, 331

(56) References Cited

U.S. PATENT DOCUMENTS 3,638,556 * 2/1972 Sato et al. ........................... 99/329 R
3,694,623   9/1972 Tadao et al. .
3,870,863 * 3/1975 Ohnmacht ............................ 219/532
4,038,520 * 7/1977 Boller et al. ......................... 219/521
4,745,855 * 5/1988 Younger ............................... 219/521
5,385,082 * 1/1995 Huggler et al. ....................... 99/328
5,644,974 * 7/1997 Slavin ................................. 219/521

FOREIGN PATENT DOCUMENTS 20 14 341 A   10/1971   (DE) .
25 42 944 A    3/1977   (DE) .
0 276 644 A    8/1988   (EP) .
927 572 A     11/1947   (FR) .

* cited by examiner

Primary Examiner—Joseph Pelham
(74) Attorney, Agent, or Firm—Bacon & Thomas, PLLC (57) ABSTRACT

An electric heating element (11) in which electrically conductive tape (23) is wound on a non-electrically conductive former (12) and the tape is completely covered by covers (30) of electrically non-conductive but heat conductive material secured to the former. Preferably the covers and former are of Mica or Micanite. The covers are secured to the former by channel sectioned strips (31) along opposite side edges and by fastening eyelets (26) extending through the covers and former intermediate the edges. For use in an upright toaster the tape is wound continuously round the former with each run thereof extending between the grooves in the opposite side edges of the former, the grooves in the upper portion being spaced from one another by 4.6 to 7 mm while the grooves in the lower portion of the former are spaced by a smaller distance in the range 3.6 to 5 mm. For use in a conveyor toaster the runs adjacent the sides of the conveyor are more closely spaced than those in the center. The invention extends to toasters and other cooking or heating apparatus incorporating such elements.

21 Claims, 10 Drawing Sheets

ELECTRIC COOKING AND TOASTING APPARATUS AND ELECTRIC ELEMENTS THEREFOR

FIELD OF THE INVENTION

This invention relates to an electric element and to a toaster or other cooking apparatus (which term includes apparatus for reheating already cooked food) incorporating a plurality of such elements.

BACKGROUND OF THE INVENTION

Conventionally an element for an upright toaster comprises a former of an electrically non conductive material and an electrically conductive tape wound continuously round the former with each run thereof extending between grooves in the opposite side edges of the board or each half of the board. The conductive tape is exposed except that one or more narrow strips of non-electrically conductive material are frequently located outside the tape running from top to bottom of the former, and spaced from the side edges, to limit the amount of outward bowing of the tape and to prevent the tape flying outwards if it breaks.

A toaster comprises a plurality of such elements which could be connected in parallel or in series. Because the conductive tape is exposed and can be easily touched by anything inserted into the toaster slots it is a requirement that the toaster must be double pole switched. This increases the cost of the toaster particularly if any electronics are incorporated in the toaster. It is also a requirement for upright toasters that an array of guard bars to prevent toast contacting the elements and which define the toaster slot are spaced at least 4 mm from the tape (since this is likely to bow outwardly when hot).

Conveyor toasters or other cooking apparatus in which elements are located horizontally conventionally also have live conducting tape or strip exposed, and suffer from uneven heating across the width of the apparatus.

SUMMARY OF THE INVENTION

In one aspect, the present invention provides an electric element in which electrically conductive tape is wound on a non-electrically conductive former and the tape is completely covered by cover means of electrically non conductive but heat conductive material.

Preferably the or each cover is secured to the former by channel sectioned strips extending over the edges of the former and cover or covers on at least two opposite sides and by fastening means extending through the cover or covers at at least two positions intermediate those sides and not contacting the tape. This provides a particularly easy method of construction.

The cover on each side of the former may be formed by a single piece of material or has two pieces or more (up to ten) pieces of material overlapping at their adjacent edges.

Using such elements in a toaster or other cooking apparatus is safer because the electrically conductive tape cannot be touched so as to make electrical contact by a knife or finger or other object inserted into the toaster or the like. This allows the apparatus to be single pole switched. In addition the number of guard bars in an upright toaster can be reduced because the toast in the slot cannot touch the conductive tape. In addition the arrangement increases the life of the element considerably because most failures are caused by bits of bread, toast, currants or other ingredients falling off and touching the tape. This causes a burn-out which may be explosive. Also instruments inserted can no longer break the tape. In addition because the tape cannot bow outwardly the space between the element and the guard bars in an upright toaster can be reduced.

Preferably the cover material is either mica or mica paper (a combination of mica and silicon resin), particularly that known as Micanite, either Moscovite or Phologopite, depending on the temperature requirements. We have found that with covers made of this material in a toasting apparatus, the toasting performance is improved for a particular heat input and is more even over the area of the toast. The former may be made of mica or Micanite so that the heat generated in the tape is absorbed by the former and cover material and then radiated evenly towards the toast.

The channel-sectioned strips located along the side edges of the former serve to stabilise the former and hold the edges of the covers to the former. The channel-sectioned strips are not otherwise connected so that they do not prevent expansion of the former on heating. The fastening means, such as eyelets, reduce bowing of the cover away from the former. The eyelets may hold in place washers of electrically insulating but heat conductive material to increase the area over which the covers are held to the former.

The or each cover may be formed with slots at positions between the runs of tape but so that the cover still covers the tape to increase the heat output.

In one preferred form, where the former is made from a single piece of material, the tape starts adjacent one end of the former, is wound spirally towards the other end using alternate grooves, passes through a slot in the other end of the former to change direction, is wound spirally towards said one end using the remaining grooves and ends adjacent said one end of the former.

The former may be made in two parts, each with grooved upright edges with the tape wound first round one part, then the other part and the parts then secured together with abutting edges before connection of the covers. Each part may itself be preformed from one or more pieces connected along horizontal overlapping edges.

In a preferred form for an upright toaster, the former has a dimension in the range 130 to 150×160 to 180 mm (preferably 140×171 mm) and a thickness in the range 0.3 to 0.7 mm. Preferably each cover has a thickness in the range 0.1 to 0.3 mm.

Preferably the former and covers have convex rounded or sloped top edge corners corresponding to the shape of many loaves of bread, and to the end profile of the toaster. This allows the height of the former in the central portion to be greater.

The invention extends to an electric toaster or other apparatus including a plurality of such elements and which is preferably single pole switched. Preferably the elements are connected in parallel to an electrical supply. With such an arrangement, even if one element fails the remaining elements will continue to function. In addition each element can have a greater (or lesser) length of tape to produce the required watt density and thus produce more heat, giving faster toasting or heating.

For toasting the tape should be selected to produce a watt density equal to or less than 3 watts per $cm^2$ or within the operating band of the tape. With conventional 80/20 nickel chrome alloy tape, and with parallel connection of the elements to a 230 volt supply, the tape for each element can have a length in the range 5 to 10 meters, preferably 7 to 9 meters, in order to achieve this.

In another aspect the invention provides an electrical element for an upright toaster comprising a former of electrically insulating but heat conductive material and electrically conductive tape wound spirally on the former in a plurality of runs extending between grooves in opposite side edges of the former or each part of the former, the runs in the upper portion being spaced from one another by 4.6 to 7 mm for a 200 to 250 volt supply and twice this for a 100–125 volt supply, while the runs in the lower portion of the former are spaced from one another by a smaller distance in the range 3.6 to 5 mm for a 200–250 volt supply and twice this distance for a 100 to 125 volt supply, the length of the tape being in the range 5 to 10 meters for a 200 to 250 volt supply and half this length for a 100 to 125 volt supply and the watt density being equal to or less than 3 watts per $cm^2$ or in accordance with tape tolerances.

With advantage the spacing of the grooves in the lower part is in the range 3.6 to 4.5 mm for a 200 to 250 volt supply while the spacing in the upper part is in the range 4.6 to 6 mm for a 200–250 volt supply. One or more adjacent grooves may be spaced more widely apart to accommodate fastening means extending through the former and not contacting the tape. Alternatively where the former is formed in two parts, with their adjacent vertical grooved edges substantially abutting, the grooves in the area of the eyelets/rivets may be deeper.

The invention extends to an upright toaster incorporating a plurality of such elements connected in parallel.

For a conveyor toaster or other food heater where elements are located horizontally on either side of a continuous conveyor, the elements again provide safer and more even heating, particularly if the runs of tape at the centre of the element are more widely spaced than those adjacent the sides of the conveyor. The elements may also be used in other cooking apparatus such as grills or a pizza oven.

BRIEF DESCRIPTION OF THE DRAWINGS

Embodiments of electrical element and toasters incorporating a plurality of such elements will now be described, by way of example only, with reference to the accompanying drawings of which.

DETAILED DESCRIPTION OF EMBODIMENTS OF THE INVENTION

Figure 1:
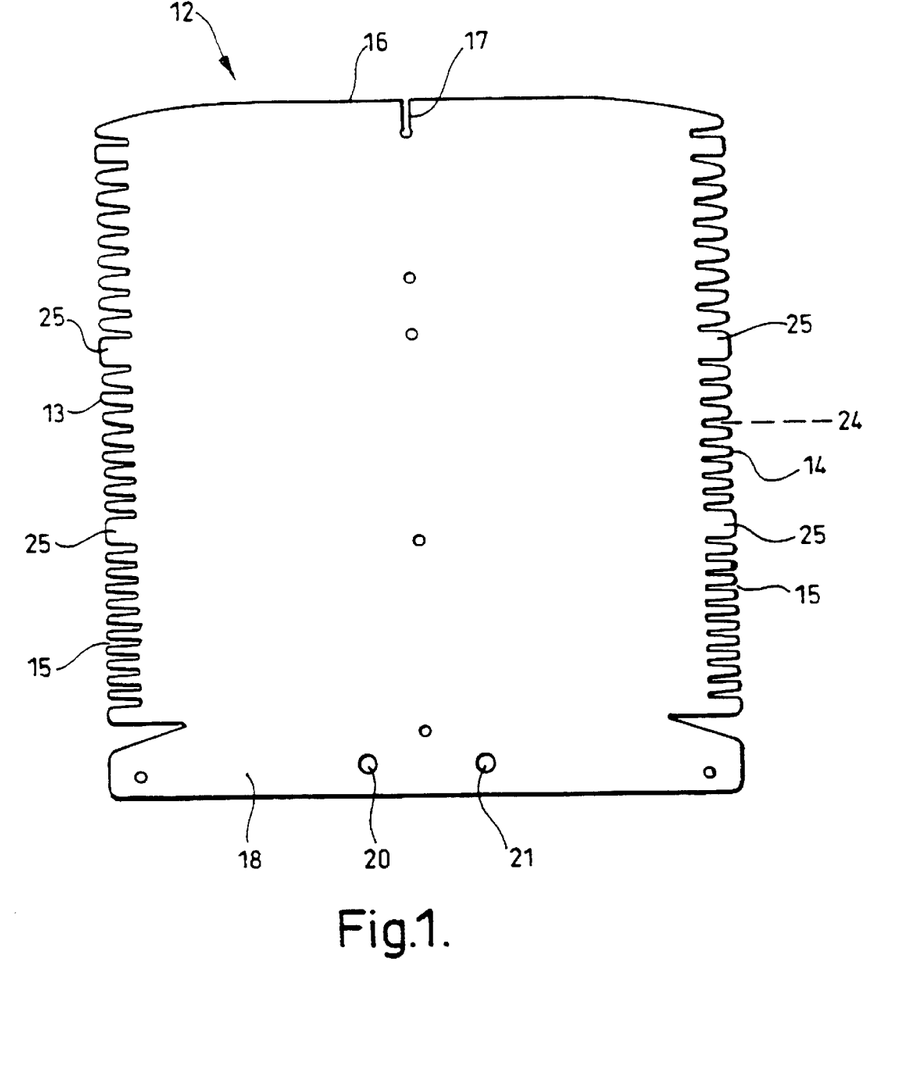
FIG. 1 is a front view of a former for an electric element for a toaster.
Figure 6:
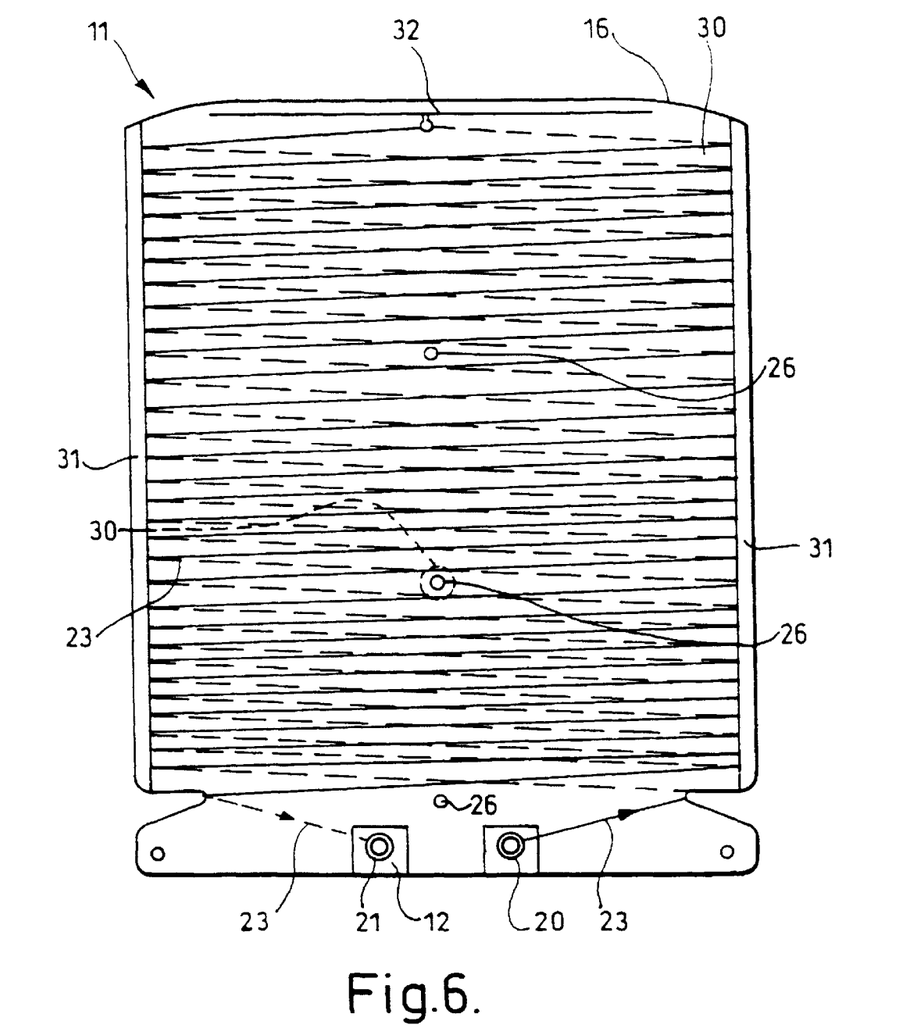
FIG. 6 shows a front view of an assembled element.

As seen in FIGS. 1 and 6, an electric element 11 for an upright toaster comprises a former 12 made of mica or Micanite of dimensions 140×171×0.5 mm, having upright side edges 13, 14 formed with spaced outwardly tapered grooves 15 therealong. The former has a top edge 16, the outer corners of which are angled or convex rounded so as to approximately conform to the shape of a conventional round topped loaf. A central keyhole slot 17 opens to the top edge 16. A bottom portion 18, below the lowest grooves 15, is formed with holes 20, 21 for providing connection points to an electrical supply. As seen in FIG. 6, conventional 80/20 nickel chrome alloy, electrically conducting tape 23 is wound spirally round the former starting at hole 20 and locating in alternate grooves, before passing through the keyhole slot 17, changing direction and being wound spirally downwardly using the remaining grooves and ending in the opening 21. (The tape on both sides of the board is indicated in FIG. 6). The grooves in the lower portion of the former, up to the level 24, are spaced 4 mm apart while the grooves in the upper portion, above level 24, are spaced 5 mm apart. Two wider portions 25 of 8 to 10 mm spacing between grooves are provided to accommodate fastening devices 26 extending through the former without touching the tape.

Figure 2:
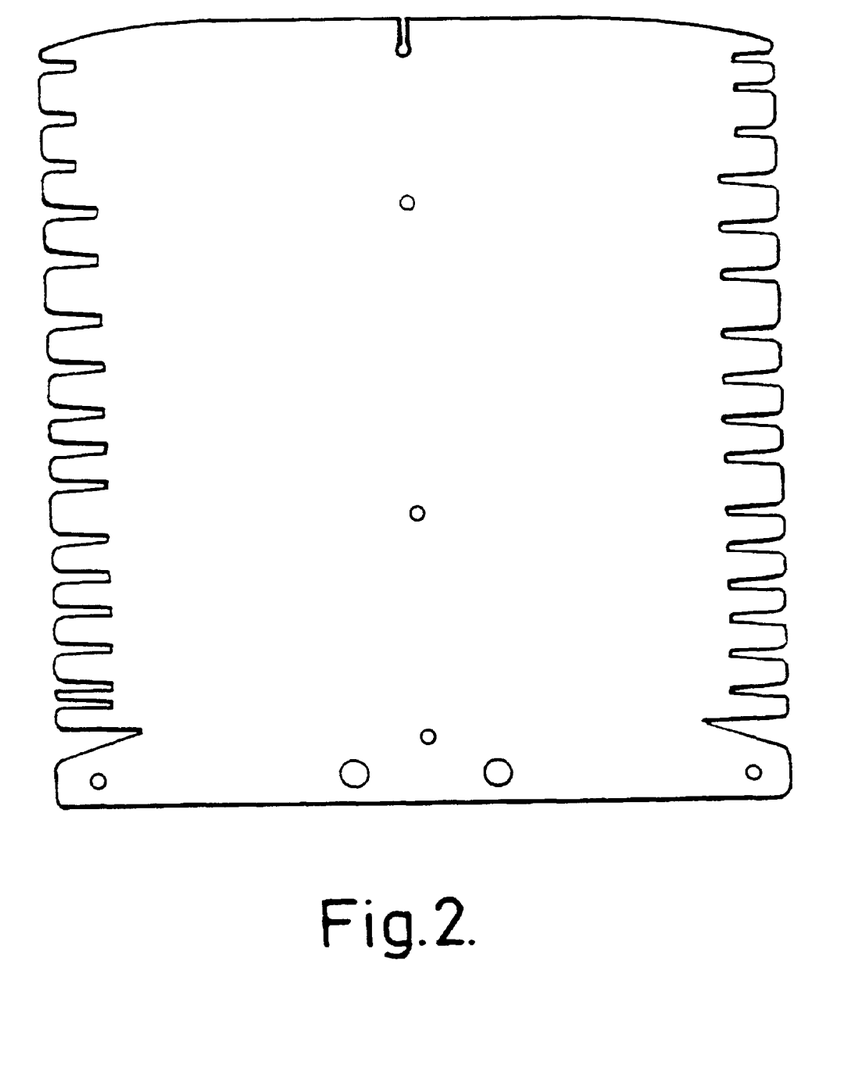
FIG. 2 is a front view of a modified former.

We have found that with parallel connected elements, a tape length of the order of 7½ meters to provide a watt density less than 3 watts per $cm^2$ and with a voltage of 230 volts, this arrangement of the tape runs gives a radiant heat pattern which provides completely even toasting over the whole toast area. The same spacing between each tape run can be used for all voltages in the range 200–250 volts. For voltages in the range 100 to 125 volts either only every other groove of the former is used or a former having half the number of grooves with double the spacing between runs is required, as seen in FIG. 2.

Figure 3:
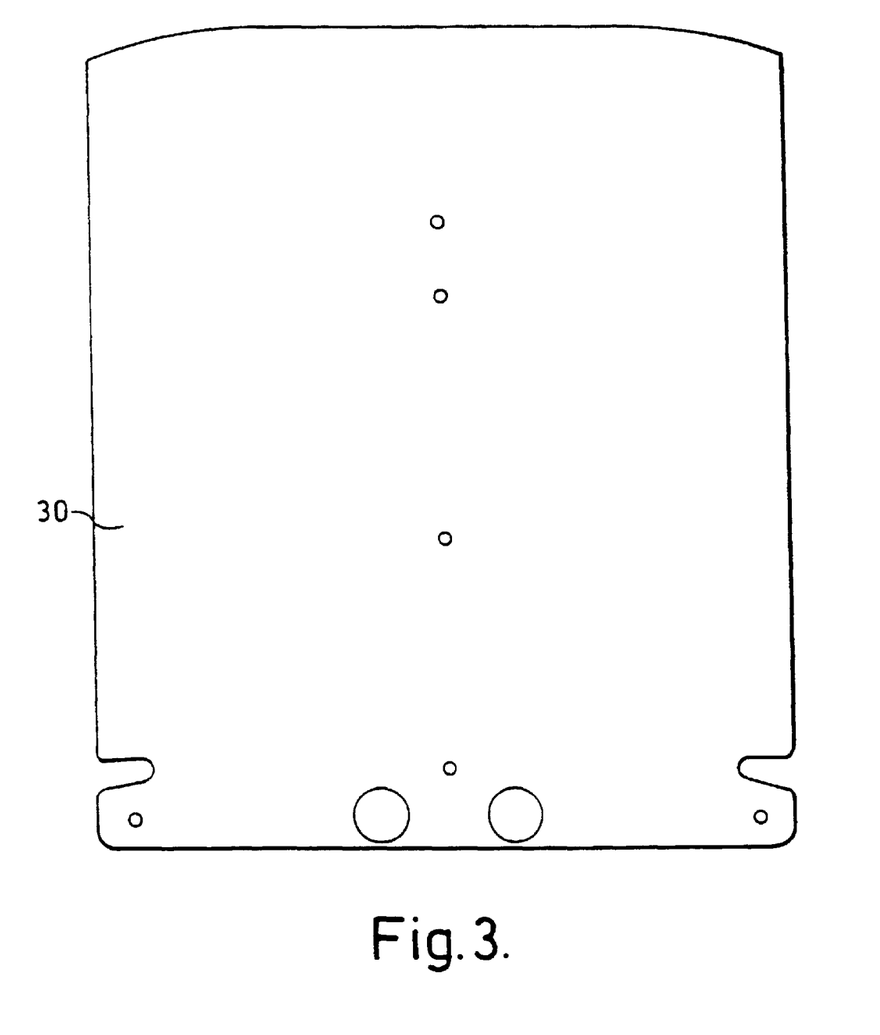
FIG. 3 is a front view of one form of cover for an electric element.

Each side of the former is covered by a respective cover 30, each of the same shape and size as the former with a thickness 0.1 to 0.3 mm (preferably approximately 0.2 mm), arranged to completely cover the tape on that side of the former so that no live wire is exposed. (The terminals for connection to a power supply may be exposed but will be below the bottom of the toaster slots). As seen in FIG. 3 each cover may be formed from a single piece of material, preferably Mica, and is provided with vertically spaced apertures 27 on its centre line for receiving the fasteners such as 26.

If the former has tape on only one side, only one cover will be required.

As seen in FIG. 6, along each of side edges 13, 14 a channel sectioned strip 31 of plated steel is located to stabilise the former and hold the side edges of both covers to the former. A similar strip 32 is located along the central portion of the top edge 16 but not joined to the side strips. The covers 30 are additionally held to the former by three centrally located fastening means 26 (two aligned with portions 25 and one below the tape), for example in the form of eyelets. Electrically insulated washers, one of which is indicated at 30 may be located around the fastening means. The channel sectioned strips 31 are formed with dimples, projecting inwardly, at positions coinciding with the wider portions 25 of the former. The covers may also be secured to the former by fasteners at their bottom corners, below the strips 31. No other connection of the covers to the former is required.

Figure 4:
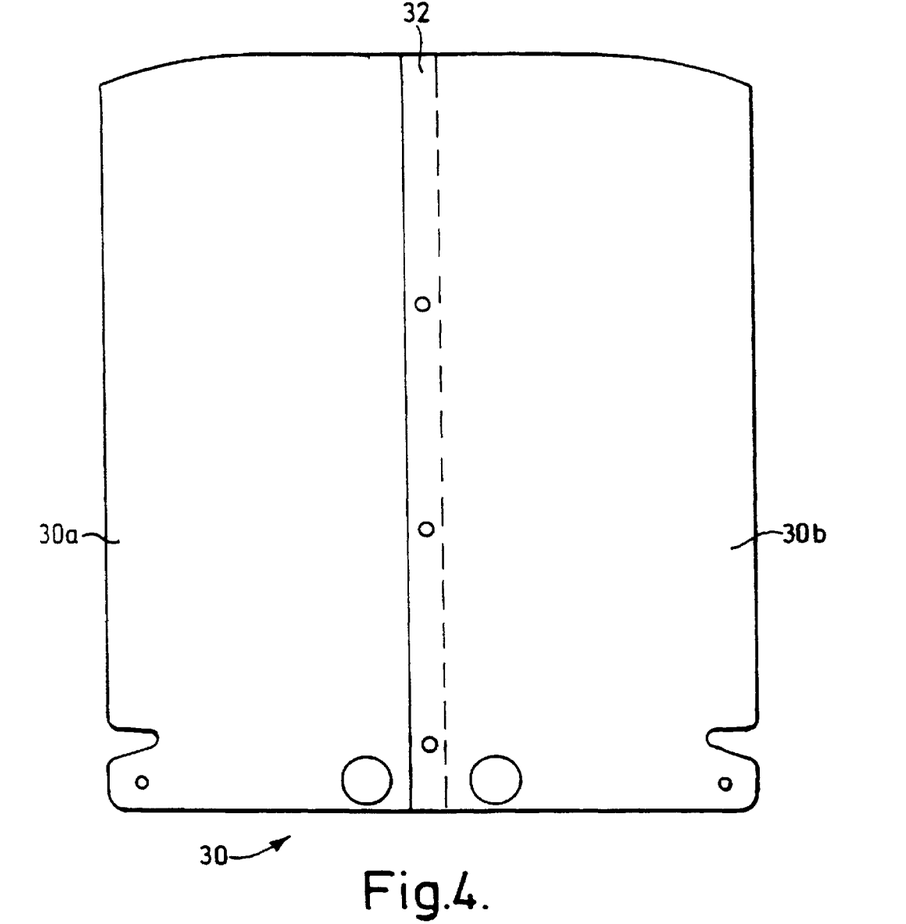
FIG. 4 is a front view of another form of cover.

As seen in FIG. 4, in another form the cover 30 is made in two parts 30a, 30b, preferably of Mica material. The parts 30a, 30b overlap at 32 along their central vertical adjacent edges by 8 mm (in the range 6–10 mm). The parts 30a, 30b in the assembled heating element are connected to each other solely by central fasteners 26 and are connected to the former solely by the fasteners 26 and the strips 31 and 32 as in the arrangement of FIG. 6. There are no other overlying strips or cover parts so that the two parts 30a, 30b only together form a cover 30 completely covering one side of the former and leaving no tape exposed. The mounting and fastening is extremely simple and provides even heat output.

Figure 5:
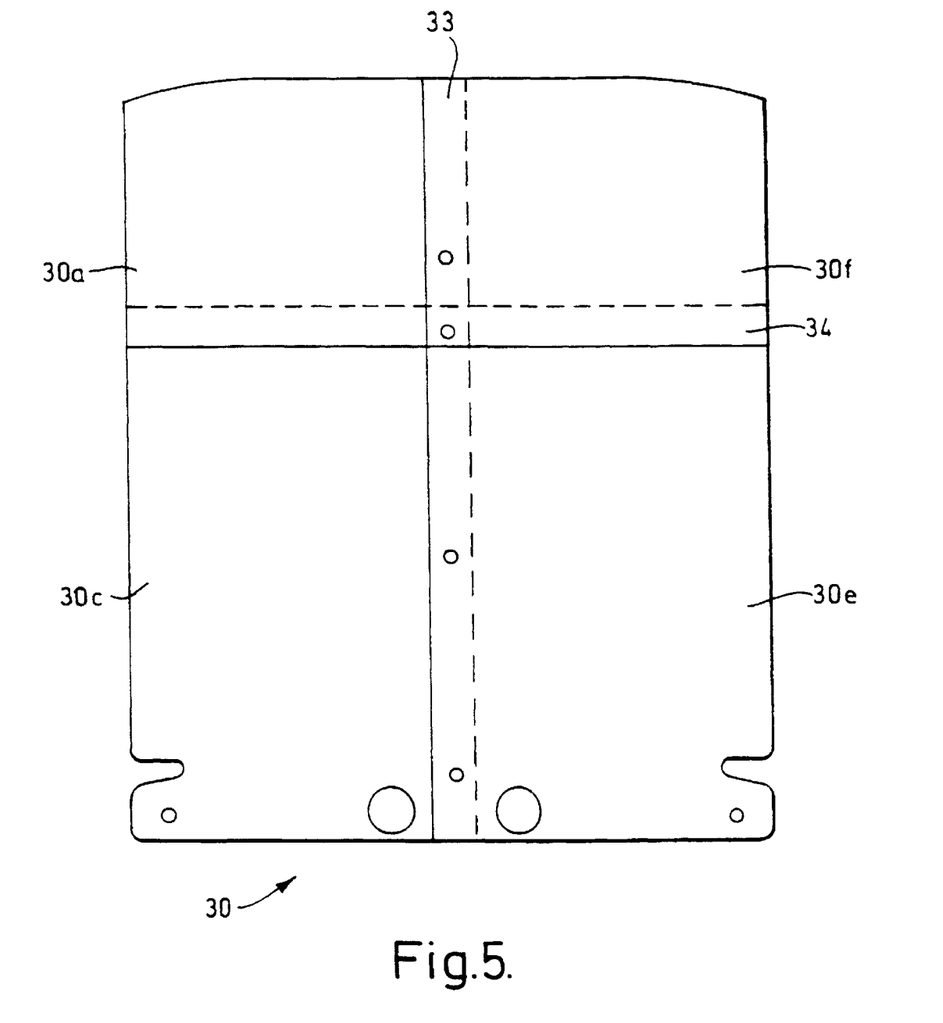
FIG. 5 is a front view of a third form of cover.

As seen in FIG. 5, in another form the cover is made in four parts, 30c, 30d, 30e and 30f of Mica material, which in the assembled element overlap over their adjacent vertical and horizontal edges at 33 and 34. The parts are connected to each other and the former by fasteners such as 26 extending through the overlapping portions at positions which coincide with the wider portions 25 or the like on the former. Again the cover parts are secured along their side and upper edges to the former by strips 31 and 32 as in the arrangement of FIG. 6. The four cover parts 30a, 30b, 30c and 30d without any other overlying strips form a cover which covers the whole former and the tape. The cover might be made of up to ten parts similarly connected.

Figure 9:
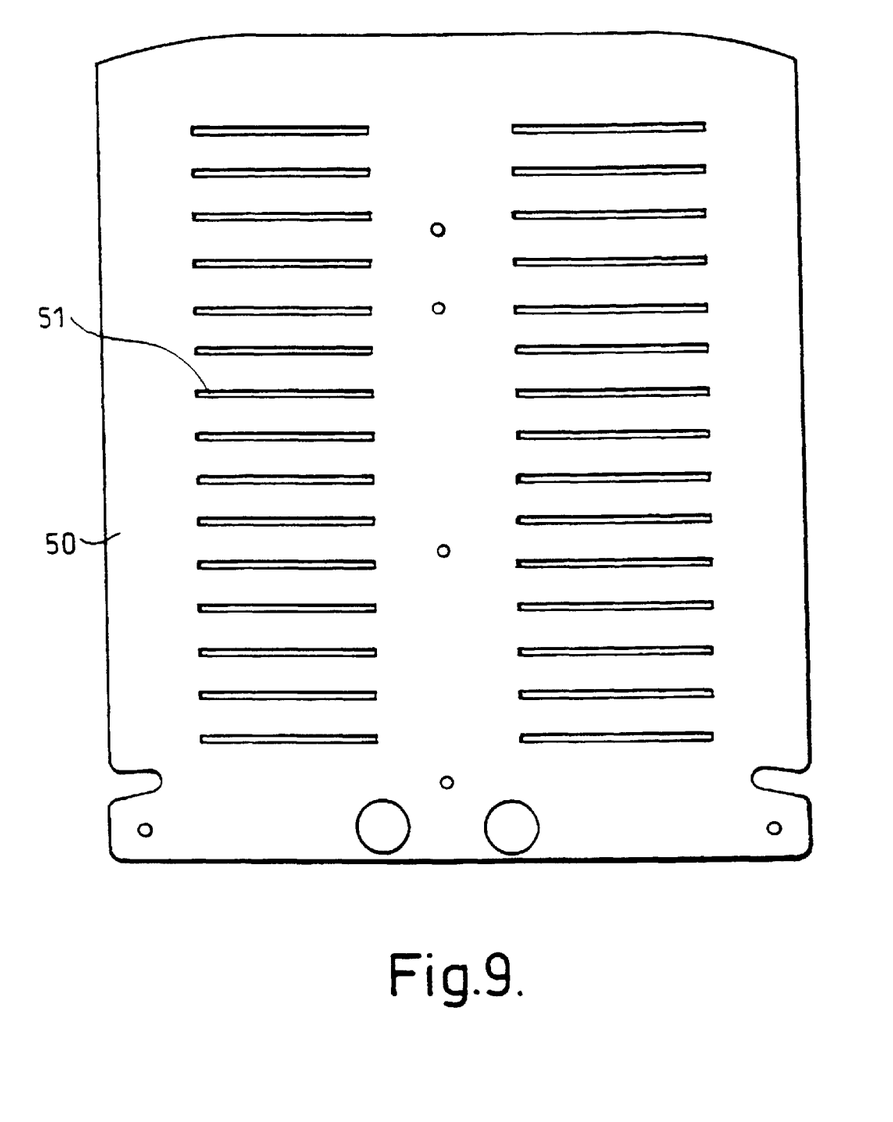
FIG. 9 shows a modified cover for an element.

FIG. 9 shows a modified cover 50 having a plurality of slots 50A arranged so that in the assembled element the slots will be located between runs of tape. The tape itself will therefore still be completely covered but the slots (or other apertures) will allow greater transmission of heat to the toast. Similar slots may be incorporated into the other covers such as those of FIGS. 4 and 5.

Figure 10:
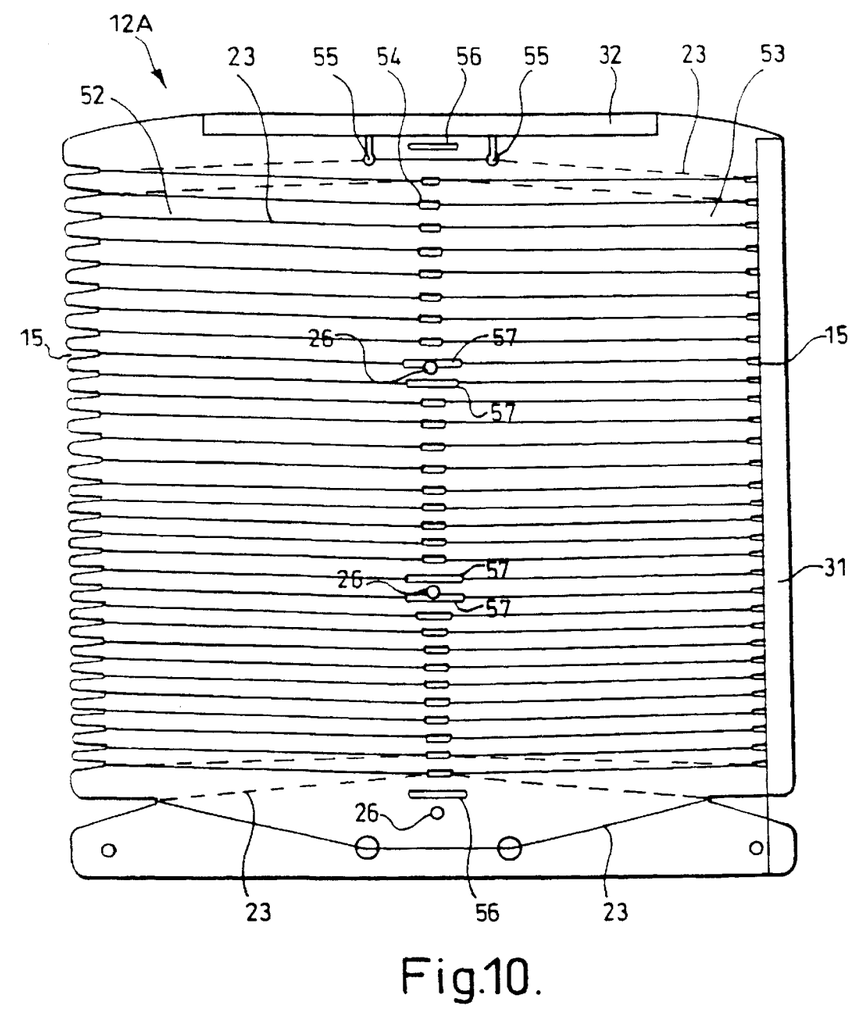
FIG. 10 shows a modified former for an element.

FIG. 10 shows a modified former 12A formed in two parts 52, 53, each part formed with tapered grooves 15 along its upright edges and the parts abutting along their adjacent upright edges so that the grooves coincide to form a series of slots 54 along the centre of the former, when the parts 52, 53 are connected. The conducting tape 23 is wound first round one part, threaded through the keyhole slots 55 into the other part, wound round the other part and the two parts are then secured together, before the cover or covers 30 are assembled to the former. The parts in this embodiment are secured together by staples 56 extending through the abutting edge portions adjacent the top and bottom of the former; other securing means could be used.

Two pairs of adjacent grooves 15 on the overlapping edges are seen at 57 to be deeper than the remaining grooves so that the conductive tape is kept away from the central areas where the eyelets or other fastening means 26 will be positioned. This avoids the need for wider portions 25 and wider spaces between the tape runs. Otherwise the former and connections are as in previous embodiments, and may be connected to covers with channel sectioned steps 31, 32 and eyelets 26 as previously described. Some of these are indicated in the drawing but will not be present until the covers are in place.

In FIG. 10 the tape windings on the front face are shown in full line, while the windings on the back face are indicated in broken line only at the top and bottom of the former.

Figure 11:
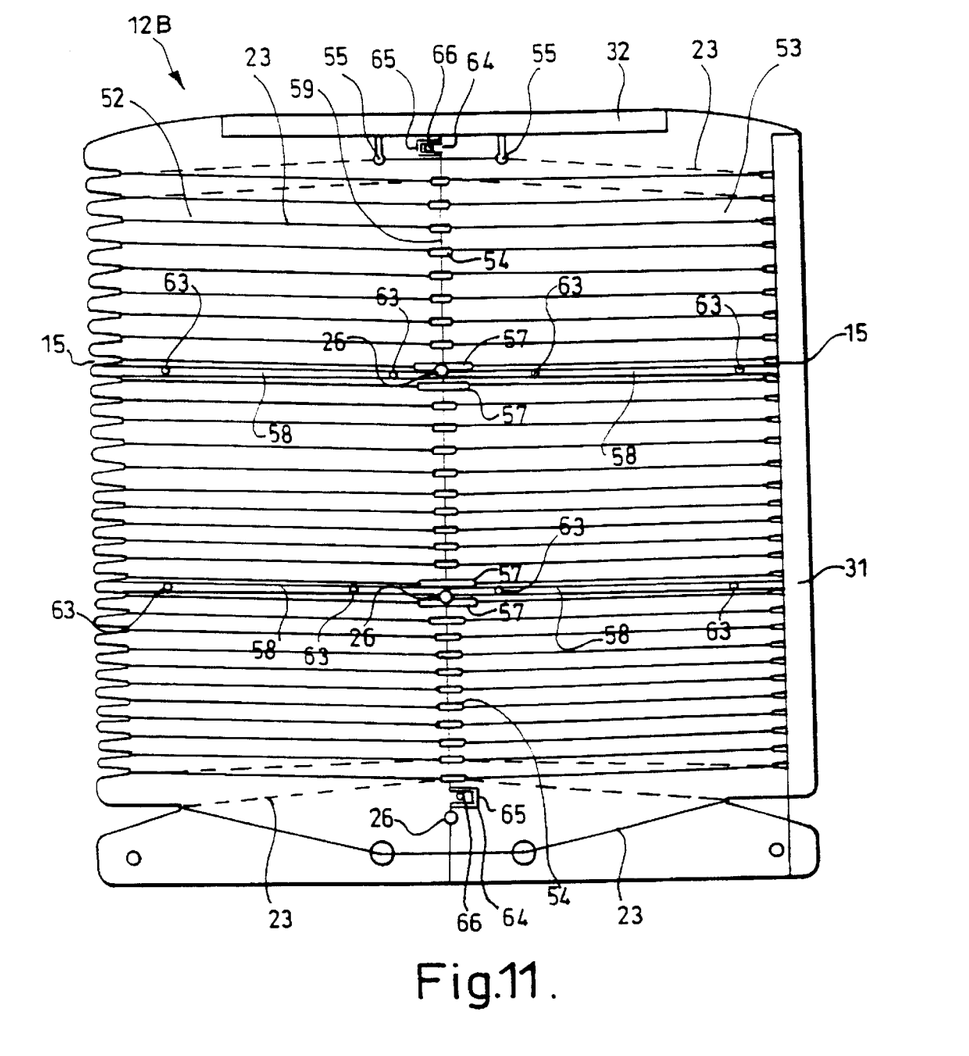
FIG. 11 shows a further modified former.

FIG. 11 shows a further form of former 12B made of Mica and having two parts 52, 53 each with two vertical grooved edges and with the abutting central edges 59 having their grooves aligned as in FIG. 10. In this arrangement each part 52, 53 is first assembled from three pieces 60, 61, 62 having their horizontal edges overlapping and secured together, for example by eyelets 63. (Up to five pieces may be used). The Mica, in practice, consists of two layers of material. In order to secure the parts 52, 53 together, before the covers are assembled to the former, one of the layers on one of the parts 52, 53 is formed with a tag 64 extending outwardly from its edge 59 and the same layer on the other part is formed with a similar cut out 65 at the corresponding position when the edges 59 of the parts are abutted. Thus at the positions of the tags and cut outs, the first layer of one part overlaps the back layer of the other part and the parts are secured together by fastening means 66, such as eyelets, extending through these overlapping portions.

Figure 7:
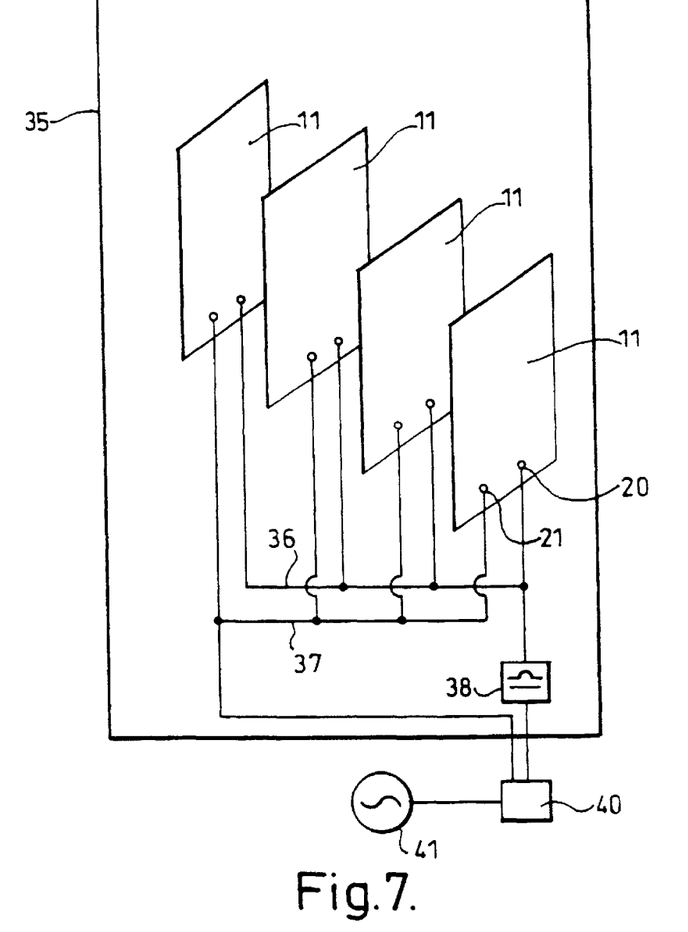
FIG. 7 is a diagrammatic view of a toaster incorporating a plurality of such elements in an upright disposition.

As indicated diagrammatically in FIG. 7 a plurality of such elements are located in an upright disposition in a toaster 35 and connected in parallel via lines 36 and 37 and via a single pole switch 38 in the live line to a plug 40 which will connect the toaster to an electrical power source 41.

Figure 8:
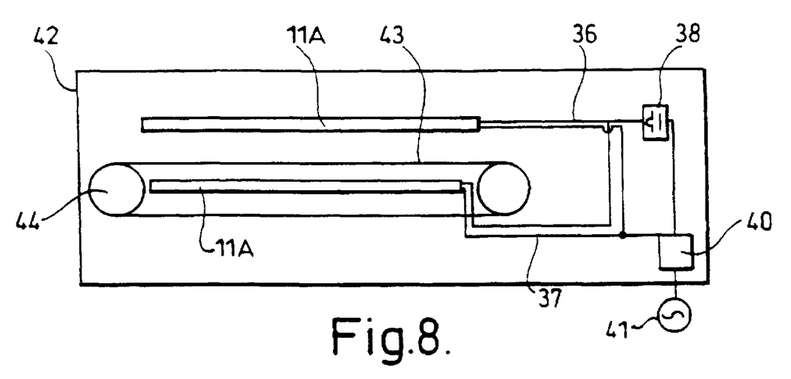
FIG. 8 is a diagrammatic view of a toaster or other food heating or cooking apparatus incorporating elements in a horizontal disposition.

As indicated diagrammatically in FIG. 8 a plurality of similar elements 11A of appropriate size and rating are located horizontally in a conveyor toaster or other cooking or heating apparatus 42. Two elements 11A are shown on either side of the top run 43 of a continuous conveyor 44. The elements are connected to power source 41 as in FIG. 4. Preferably the runs of tape in the centre of each element are less closely spaced than the runs adjacent the sides of the conveyor or other heating apparatus to provide even heating across the width of the apparatus.

What is claimed is:

1. An electric heating element (11) in which electrically conductive tape (23) is wound on a non-electrically conductive former (12) and the tape is completely covered by a cover or covers (30) of electrically non-conductive but heat conductive material secured to the former by channel sectioned strips (31) extending over the edges of the former and cover or covers on at least two opposite sides (13, 14) and by fastening means (26) extending through the cover or covers at at least two positions intermediate those sides and not contacting the tape.

2. An element according to claim 1 in which the or each cover (30) is formed from Micanite or Mica, and the fastening means (26) are positioned substantially equidistantly from the sides.

3. An element according to claim 1 in which the or each cover (30) is formed in two or more pieces (30a–30f) from Mica, the adjacent edges of which pieces are overlapped with one another and the fastening means (26) extend through the overlapped edges, each piece having at least one edge secured to the former by a said channel sectioned strip (31).

4. An element according to claim 1 in which the former (12) has a thickness-in the range 0.3 to 0.7 mm.

5. An element according to claim 1 in which the or each cover (30) is made from material having a thickness in the range 0.1 to 0.3 mm.

6. An element according to claim 1 in which the or each cover includes slots (51) extending between runs of the tape.

7. An element according to claim 1 for use in an upright toaster in which the former (12) has a dimension in the range 130 to 150×150 to 180 mm, and said opposite sides are upright side edges in use.

8. An element according to claim 1 in which the former (12A) is formed in two parts (52, 53), each part (52, 53) being formed with grooves (15) along its opposite edges with the conducting tape (25) wound continuously round one part and then the other part, the parts being secured together with their central edges (59) abutting one another before the covers are secured to the former.

9. An element according to claim 8 in which the parts (52, 53) are secured together by staples (56).

10. An element according to claim 8 in which the former is made of two layers of Mica, one layer of one part (52) of the former having a tag (64) extending outwardly from its edge (59) and the same layer of the other part (53) being formed with a cut out at a corresponding position when the parts have their edges (59) abutted, the parts being connected together by fastening means (66) extending through the tag (64) and other layer of the other parts.

11. An element according to claim 8 in which some of the grooves (15) in the abutting edges (59) are deeper than the adjacent grooves so that the tape (23) is distanced from the fastening means (26).

12. An element according to claim 1 for use in an upright toaster in which the former (12) and covers (30) have sloped or rounded upper corners, and including a channel sectioned strip (32) securing part of the upper edge of the or each cover to the upper edge of the former.

13. An element according to claim 1 for use in an upright toaster in which the tape (23) is wound continuously round the former with each run thereof extending between grooves (15) in the opposite side edges of the former or parts (52, 53) of the former, the runs in the upper portion being spaced from one another by 4.6 to 7 mm for a 200 to 250 volt supply and twice this distance for a 100 to 125 volt supply while the runs in the lower portion of the former are spaced from one another by a smaller distance in the range 3.6 to 5 mm for a 200 to 250 volt supply and twice this distance for a 100 to 125 volt supply, the length of the tape being in the range 5 to 10 meters for 200 to 250 volt supply and half this length for a 100 to 125 volt supply and the watt density being equal to or less than 3 watts per $cm^2$.

14. An element according to claim 13 in which the majority of the grooves (15) in the lower part are spaced from one another by a distance in the range 3.6 to 4.5 mm while the majority of the grooves in the upper part are spaced by a distance in the range 4.6 to 6 mm.

15. An element according to claim 1 for use in a horizontal disposition in a toasting or cooking apparatus in which the tape is wound continuously round the former with each run thereof extending between grooves in opposite side edges of the former, the runs adjacent opposite ends of the former being more closely spaced than the runs adjacent the centre of the former.

16. An element according to claim 1 including terminals adjacent the bottom edge of the elements for connection to a power supply.

17. An element according to claim 1 including washers of non-electrically conducting material around one or more of the fastening means.

18. An element according to claim 1 in which the tape is chosen to provide a watt density equal to or less than 3 watts per $centimeter^2$.

19. An electric element for a toaster comprising a former (12) of electrically insulating but heat conductive material and electrically conductive tape (23) wound spirally on the former in a plurality of runs extending between grooves (15) in opposite side edges (13, 44, 59) of the former or parts (52, 53) of the former, the runs in the upper portion being spaced from one another by a distance in the range 4.6 to 14 mm while the runs in the lower portion of the former are spaced from one another by a smaller distance in the range 3.6 to 10 mm, the length of the tape being in the range 5 to 10 meters and the tape being selected to give a watt density equal to or less than 3 watts per $centimeter^2$.

20. An element according to claim 18 in which the spacing of the runs in the lower part is in the range 3.6 to 4.5 mm while the spacing in the upper part is in the range 4.6 to 6 mm, with one or two adjacent pairs of runs being spaced more widely apart, or those of the grooves adjacent fastening means being deeper, so as to distance the tape from conductive parts.

21. A method of manufacturing an element comprising a former wound with conductive tape, on or both sides of which former are covered by a cover of electrically non-conductive but heat conductive material, the former being assembled from two parts (52, 53), which comprises: first winding the tape continuously round one part and then round the other part; then securing the two parts together with two edges abutting; then securing the cover or covers to the former by channel-sectioned strips around their aligned opposite edges and fastening means extending through the or each cover and the former intermediate the edges.

* * * * *